2,825,736
SULFONIC ACID ESTERS OF ETHANOLAMINES

Arthur C. Cope, Belmont, Mass., and Marion Burg, Metuchen, N. J., assignors to Merck & Co., Inc., a corporation of New Jersey No Drawing. Application January 30, 1953
Serial No. 341,592

7 Claims. (Cl. 260—456)

This invention relates to new esters of ethanolamines and more particularly to sulfonic acid esters thereof and to their preparation.

The ethanolamines involved in the invention are secondary amines in that a cyclic or acyclic alkyl group, such as a cyclohexyl or a n-amyl radical is attached to the nitrogen. They can be primary alcohols. They also can be secondary alcohols in that a lower alkyl group, such as a methyl or an ethyl radical, can be attached to the carbon atom to which the hydroxyl group is attached. A methyl or an ethyl radical may or may not be attached to the carbon atom of the ethanol fragment to which the nitrogen atom is attached. Representative ethanolamines of these various types are disclosed in the following articles by Arthur C. Cope, one of the present inventors, and others: Synthesis of 2-alkylaminoethanols from ethanolamine, JACS, 64, 1503 (1942); 1-alkylamino-2-propanols and their p-nitro and p-aminobenzoates, JACS, 66, 1453 (1944); Monoalkylaminopropanols and butanols and their esters, JACS, 66, 1738 (1944).

The sulfonic acids from which the sulfonic acid esters are derived may be alkanesulfonic acids, such as methane, butane, or hexane sulfonic acids; arylsulfonic acids, such as benzene-, p-toluene- or p-nitrobenzenesulfonic acids; or arylalkanesulfonic acids, such as phenylmethanesulfonic acid.

The compounds of the invention may be prepared from the secondary ethanolamine by esterification procedures. For example, this may involve the conversion of the ethanolamine to the hydrochloride to block amide formation and the addition of various aliphatic and aromatic sulfonyl halides, advantageously the chlorides, in chloroform containing 1 to 4 equivalents of pyridine at a low temperature on the order of 0° C. The hydrochloride salts which are thus obtained can be converted to the free bases by the addition of a base such as sodium hydroxide or sodium carbonate.

Another method of esterification involves the conversion of the ethanolamine to the sodium alkoxide, advantageously by treatment with sodium hydride in ether followed by addition of the sulfonyl chloride at a very low temperature on the order of −10° C. A third method involves a modification of the second method in that an inverse order of addition was used as the sodium alkoxide was added to the sulfonyl chloride.

The compounds of this invention have been found to have interesting therapeutic properties, as, for example, they possess antifibrilatory action upon the heart.

The invention is further illustrated by the following examples:

EXAMPLE I

*2-cyclohexylaminoethyl methanesulfonate hydrochloride*

2-cyclohexylaminoethanol was first converted to the hydrochloride by treatment with dry gaseous hydrogen chloride in ether. 2-cyclohexylaminoethanol hydrochloride (3.6 g., 0.02 mole) and pyridine (6.3 g., 0.08 mole) were dissolved in 20 ml. of reagent grade chloroform. The solution was stirred and cooled in an ice-salt bath, and methanesulfonyl chloride (2.9 g., 0.025 mole) was added dropwise while the reaction temperature was maintained at −1 to +2°. The mixture was allowed to stand at 2° in a refrigerator for 90 hours, and the solid product was separated by filtration, washed with dry ether, and recrystallized to constant melting point from absolute ethanol. The 2-cyclohexylaminoethyl methanesulfonate hydrochloride was recrystallized from absolute ethanol and was found to have a melting point of 141.0–141.6° C.

EXAMPLE II

*2-cyclohexylaminoethyl-n-butanesulfonate hydrochloride*

The process of Example I was carried out with the exception that 2 equivalents of pyridine were used instead of the 4 equivalents of pyridine which were used in Example I. n-Butanesulfonyl chloride was used as the esterifying agent. The 2-cyclohexylaminoethyl-n-butanesulfonate hydrochloride which was obtained had a melting point of 115.6–116.8° C.

EXAMPLE III

*2-cyclohexylaminoethyl-n-hexanesulfonate hydrochloride*

The process of Example I was carried out with the exception that 2 equavalents of pyridine were used instead of the 4 equivalents of pyridine which were used in Example I. n-Hexanesulfonyl chloride was used as the esterifying agent. The product was soluble in chloroform, so the solvent was removed under reduced pressure by warming on a water bath that was not allowed to rise above 50°, and the viscous residue was washed with dry ether before crystallization. The 2-cyclohexylaminoethyl-n-hexanesulfonate hydrochloride which was obtained had a melting point of 116.4–117.4° C.

EXAMPLE IV

*2-cyclohexylaminoethyl α-toluenesulfonate hydrochloride*

The process of Example I was carried out with the exception that 2 equivalents of pyridine were used instead of the 4 equivalents of pyridine which were used in Example I. α-Toluenesulfonyl chloride was used as the esterifying agent. The 2-cyclohexylaminoethyl α-toluenesulfonate hydrochloride which was obtained had a melting point of 118.2–119.6° C.

EXAMPLE V

*2-cyclohexylaminoethyl benzenesulfonate hydrochloride*

The process of Example I was carried out with the exception that 2 equivalents of pyridine were used instead of the 4 equivalents of pyridine which were used in Example I. Benzenesulfonyl chloride was used as the esterifying agent. The 2-cyclohexylaminoethyl benzenesulfonate hydrochloride which was obtained had a melting point of 111.2–112.0° C.

EXAMPLE VI

*2-cyclohexylaminoethyl p-toluenesulfonate hydrochloride*

The process of Example I was carried out with the exception that 2 equivalents of pyridine were used instead of the 4 equivalents of pyridine which were used in Example I. p-Toluenesulfonyl chloride was used as the esterifying agent. The 2-cyclohexylaminoethyl p-toluenesulfonate hydrochloride which was obtained had a melting point of 133.4–134.0° C.

EXAMPLE VII

*2-cyclohexylaminoethyl-p-nitrobenzenesulfonate hydrochloride*

The process of Example I was carried out with the exception that 2 equivalents of pyridine were used instead of the 4 equivalents of pyridine which were used in Example I. p-Nitrobenzenesulfonyl chloride was used as the esterifying agent. Another departure from Example I involved the crystallization of the product and this was performed by adding ether to a solution of the product in a large volume of ethanol at room temperature to the point of cloudiness and cooling to —15° C. in order to avoid formation of a by-product. The 2-cyclohexylaminoethyl-p-nitrobenzenesulfonate hydrochloride which was obtained had a melting point of 103.6–104.0° C.

The procedures of Examples I to VII can be used to obtain the corresponding cyclopentyl sulfonic acid esters by using 2-cyclopentylaminoethanol instead of the 2-cyclohexylaminoethanol.

EXAMPLE VIII

*2-n-amylaminoethyl α-toluenesulfonate hydrochloride*

The process of Example I was carried out using 2 equivalents of pyridine. As starting materials 2-n-amylaminoethanol hydrochloride and α-toluenesulfonyl chloride were used. The product, 2-n-amylaminoethyl α-toluenesulfonate hydrochloride which was obtained had a melting point of 115–115.4° C.

The 2-n-amylaminoethanol can be converted to other sulfonic acid esters by utilizing the sulfonyl chlorides which are used in Examples I to VII. Also, examples of other compounds are evident from a consideration of the fact that other 2-alkylaminoethanols may be used in place of the 2-n-amylaminoethanol of this Example VIII. Such other 2-alkylaminoethanols and their preparation are set forth in the above mentioned articles by Cope et al., particularly the one appearing at JACS, 64, 1503, in Table I. As is evident from the article appearing at JACS, 66, 1738, the ethanol fragment can have a methyl or an ethyl radical attached to the carbon atom which bears the nitrogen atom.

EXAMPLE IX

*1-cyclohexylamino-2-propyl methanesulfonate hydrochloride*

The process of Example I was used using 1 equivalent of pyridine instead of the 4 equivalents. As starting materials the hydrochloride of 1-cyclohexylamino-2-propanol was employed together with methanesulfonyl chloride. The product, 1-cyclohexylamino-2-propyl methanesulfonate hydrochloride which was obtained had a melting point of 115.4–116.8° C.

Instead of using the 1-cyclohexylamino-2-propanol, it is possible to use 1-cyclohexylamino-2-butanol and obtain the corresponding ester. Or, the sulfonic acid chlorides mentioned in the preceding examples may be used as the esterifying agent.

EXAMPLE X

*2-cyclohexylaminoethyl methanesulfonate hydrochloride*

In this example the product of Example I is obtained by another of the aforementioned processes. Sodium hydride (1.0 g., 0.042 mole) was added to 75 ml. of dry ether in a 200-ml. three-necked flask fitted with a sealed stirrer, a dropping funnel and a reflux condenser, and protected from atmospheric moisture with drying tubes. 2-cyclohexylaminoethanol (5.86 g., 0.041 mole) was added over a period of 20 minutes with stirring, which was continued for 2 hours, while hydrogen was evolved and the sodium alkoxide formed. The condenser was replaced by a thermometer, and methanesulfonyl chloride (4.7 g., 0.041 mole) was added dropwise with stirring over a period of 30 minutes at a reaction temperature of —10 to —6° maintained by a bath of Dry Ice and trichloroethylene. Dry ether (25 ml.) was added so that the mixture could be stirred more efficiently, and stirring was continued for 2 hours at —10 to —14°. The mixture was filtered rapidly with suction into a flask cooled with Dry Ice, and the solid on the funnel was washed with several portions of dry ether. Dry hydrogen chloride was passed through the filtrate to precipitate the product as the hydrochloride, which was washed with dry ether and recrystallized from a mixture of dry ethanol and ether. The product, 2-cyclohexylaminoethyl methanesulfonate hydrochloride had the same melting point as that of Example I.

EXAMPLE XI

*2-cyclohexylaminoethyl methanesulfonate hydrochloride*

The process of Example X was carried out with the exception that the sodium alkoxide prepared from cyclohexylaminoethanol was added to the methanesulfonyl chloride, thus reversing the order of addition in Example X. A solution of methanesulfonyl chloride (9.4 g., 0.082 mole) in 150 ml. of dry ether was placed in a 500-ml. three-necked flask fitted with a sealed stirrer, a dropping funnel and a thermometer extending into the liquid. The solution was cooled to —8° with Dry Ice and trichloroethylene, and the suspension of the sodium alkoxide was added dropwise over a period of 40 minutes at —8 to —5°. Precipitation of sodium chloride occurred immediately, and the mixture was stirred at —8° to —5° for 1 hour after the addition was completed. The product was isolated as the hydrochloride in the manner described in Example X and had the same melting point.

From Examples X and XI will be apparent other esters using as starting materials the various ethanolamines and the various sulfonic acid chlorides of the preceding examples. Other examples of the invention will be apparent from the ones set forth above. Thus any one of the sulfonyl chlorides which have been mentioned or their equivalents may be used with one of the other aminoethanols to obtain the corresponding reaction product. As has been mentioned, the hydrochloride salts which are obtained in Examples I to IX can be converted to the free bases by the addition of an alkaline material such as sodium hydroxide or sodium carbonate.

What is claimed is:

1. Sulfonic acid esters of ethanolamines selected from the class consisting of compounds having the structure:

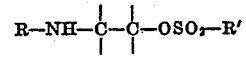

and hydrochloride salts thereof in which R is selected from the class consisting of cyclopentyl, cyclohexyl and acyclic alkyl radicals containing from 5 to 6 carbon atoms, the substituents on the ethanol fragment are selected from the class consisting of hydrogen and methyl and ethyl radicals and R' is selected from the class consisting of lower alkyl, phenyl, tolyl, and nitrophenyl radicals.

2. 2-cyclohexylaminoethyl α-toluenesulfonate hydrochloride.

3. 2-cyclohexylaminoethyl benzenesulfonate hydrochloride.

4. 2-cyclohexylaminoethyl-n-hexanesulfonate hydrochloride.

5. The process for obtaining sulfonic acid esters of ethanolamines having the structure:

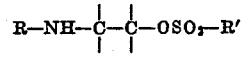

in which R is selected from the class consisting of cyclopentyl, cyclohexyl and acyclic alkyl radicals containing from 5 to 6 carbon atoms, the substituents on the ethanol fragment are selected from the class consisting of hydrogen and methyl and ethyl radicals and R' is selected from the class consisting of lower alkyl, phenyl, tolyl, and nitrophenyl radicals, which consists in adding hydrogen chloride gas to an ethanolamine having the formula

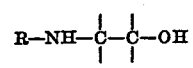

in which R is as above identified to obtain the hydrogen chloride salt, and then adding a sulfonyl chloride having the formula $$Cl-SO_2-R'$$

in which R' is as above identified at a temperature on the order of 0° C. and under anhydrous conditions to obtain the ester.

6. The process for obtaining sulfonic acid esters of ethanolamines having the structure:

$$R-NH-\underset{|}{\overset{|}{C}}-\underset{|}{\overset{|}{C}}-OSO_2-R'$$

in which R is selected from the class consisting of cyclopentyl, cyclohexyl and acyclic alkyl radicals containing from 5 to 6 carbon atoms, the substituents on the ethanol fragment are selected from the class consisting of hydrogen and methyl and ethyl radicals and R' is selected from the class consisting of lower alkyl, phenyl, tolyl, and nitrophenyl radicals, which consists in adding sodium hydride to an ethanolamine having the formula $$R-NH-\underset{|}{\overset{|}{C}}-\underset{|}{\overset{|}{C}}-OH$$

in which R is as above identified to convert it to the sodium alkoxide, and then adding to it a sulfonyl chloride having the formula $$Cl-SO_2-R'$$

in which R' is as above identified at a temperature on the order of 0° C. and under anhydrous conditions to obtain the ester.

7. The process for obtaining sulfonic acid esters of ethanolamines having the structure:

$$R-NH-\underset{|}{\overset{|}{C}}-\underset{|}{\overset{|}{C}}-OSO_2-R'$$

in which R is selected from the class consisting of cyclopentyl, cyclohexyl and acyclic alkyl radicals containing from 5 to 6 carbon atoms, the substituents on the ethanol fragment are selected from the class consisting of hydrogen and methyl and ethyl radicals and R' is selected from the class consisting of lower alkyl, phenyl, tolyl, and nitrophenyl radicals, which consists in adding sodium to an ethanolamine having the formula $$R-NH-\underset{|}{\overset{|}{C}}-\underset{|}{\overset{|}{C}}-OH$$

in which R is as above identified to convert it to the sodium alkoxide and then adding it to a sulfonyl chloride having the formula $$Cl-SO_2-R'$$

in which R' is as above identified at a temperature on the order of 0° C. and under anhydrous conditions to obtain the ester.

References Cited in the file of this patent

UNITED STATES PATENTS

| | | |
|---|---|---|
| 2,307,813 | Wayne | Jan. 12, 1943 |
| 2,348,705 | Alderman et al. | May 16, 1944 |
| 2,373,298 | Dougherty et al. | Apr. 10, 1945 |
| 2,666,034 | Bishop | Jan. 12, 1954 |

OTHER REFERENCES

Haworth et al.: J. Chem. Soc., 182 (1947).
Wendler et al.: J. Amer. Chem. Soc., 71 (1949), pp. 374–75.